June 2, 1931.  W. BAUERSFELD ET AL  1,807,614

APPARATUS FOR EPISCOPIC PROJECTION

Filed June 28, 1929

Inventors:
Walther Bauersfeld
Bruno Gerstenberger

Patented June 2, 1931

1,807,614

UNITED STATES PATENT OFFICE

WALTHER BAUERSFELD AND BRUNO GERSTENBERGER, OF JENA, GERMANY, ASSIGNORS TO THE FIRM OF CARL ZEISS, OF JENA, GERMANY

APPARATUS FOR EPISCOPIC PROJECTION

Application filed June 28, 1929, Serial No. 374,435, and in Germany June 29, 1928.

The invention refers to apparatus for episcopic projection, which are provided with several sources of light arranged laterally above the object. To provide such appliances with cooling chambers for the illuminating pencils of rays emitted by the sources of light was rather difficult and especially so when the sources of light were equipped with condensers consisting of lenses. According to the invention this difficulty is overcome by providing the appliance with an annular cooling chamber between the object and the sources of light. The hollow ring forming the cooling chamber is not necessarily closed on itself; it can, e. g., be interrupted with a view to efficient circulation of the cooling water. The arrangement of the cooling chamber with respect to the condenser systems can be any desired and in accordance with the form of the condensers it can be placed in front of or behind the same. With condensers having several lenses it preferably will be arranged between the condenser lenses, so that, with respect to the sources of light, at least one lens of each condenser is disposed behind the cooling chamber.

A specially advantageous utilization of space is attained by giving the appliance a construction which allows one each of the lenses belonging to each condenser system to be on one side of the cooling chamber the cover for one of the openings for the passage of light and, with condensers of several lenses, one lens of each condenser to be the cover also the opposite openings for the passage of light.

Figure 1:
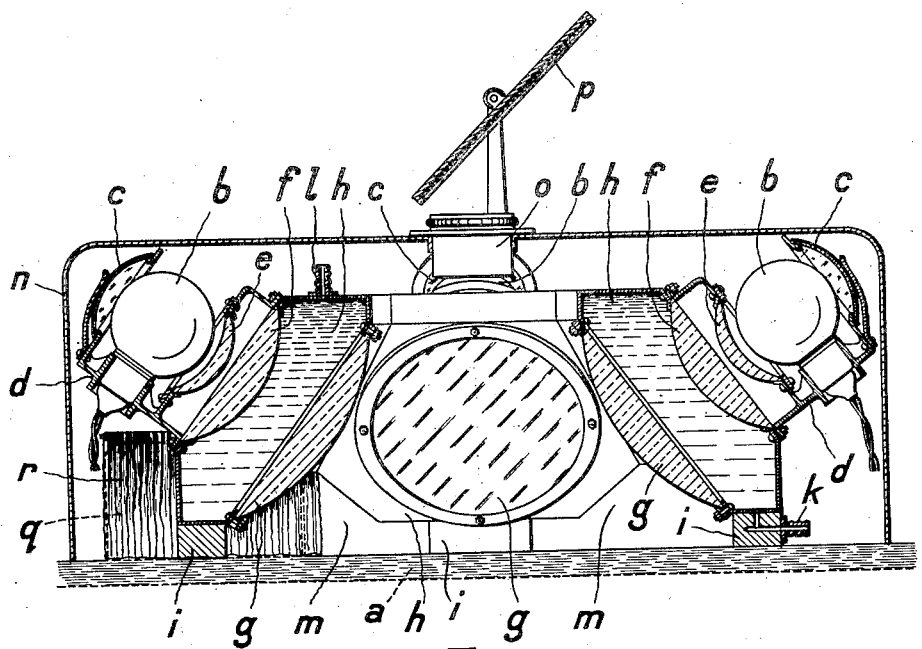
Figure 2:
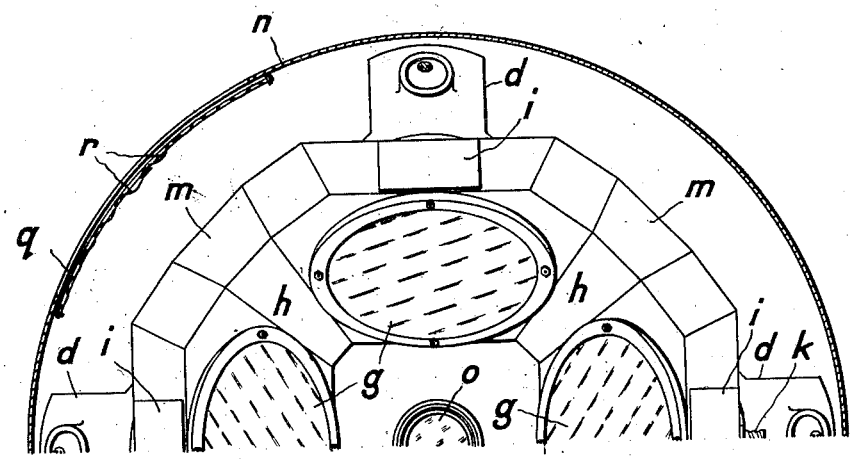

The accompanying drawing shows a constructional example of the invention and represents an apparatus for episcopic projection having as sources of light four incandescent lamps with condensers of several lenses. Fig. 1 represents in elevation a central section of the appliance, Fig. 2 one half of the view from below.

The appliance is mounted on a plate $a$ of a table and has four sources of light $b$ which are provided with concave glass reflectors $c$ and fixed on brackets $d$. Each condenser consists of three lenses $e, f$ and $g$, whereof the lenses $f$ and $g$ represent on both sides the covers for the openings for the passage of light in an annular water chamber $h$, the chamber having inner and outer surfaces of the shape of frustums of pyramids. The water chamber $h$ rests on four feet $i$ of which one is provided with a water supply pipe $k$. For the drainage of the cooling water a pipe $l$ is fitted in the upper wall of the water chamber $h$. Between the openings for the passage of light the cross section of the water chamber $h$ is narrowed down so as to provide passages $m$ for introducing the objects to be projected.

To the appliance there belongs a light protection casing $n$ which is provided with a projection objective $o$ and a projecting reflector $p$. For the introduction of the objects the light protection casing $n$ has an opening $q$ which is covered with a curtain $r$ preventing the passage of light.

When the appliance should be operated the sources of light $b$ are to be connected to any electric main and the pipes $k$ to a water supply piping. The pipe $l$ is to be provided with a discharge hose. The pencils of illuminating rays emitted by the sources of light $b$ pass through the condenser lenses $e, f$, the water chamber $h$ and, finally, through the condenser lenses $g$, whereupon they fall from four sides and under oblique angles on the objects to be projected, which latter previously were put on the plate $a$ of a table through the opening $q$ of the light protection casing $n$ and one of the passages $m$ of the water chamber $h$ and given such a position that they are exactly below the objective $o$ which, together with the reflector $p$, image them on a suitable projection surface.

We claim:

1. An apparatus for episcopic projection, containing a projecting objective, a plurality of sources of light arranged in a circle round the said objective, a plurality of condenser systems, the axes of these condenser systems being obliquely directed inward to the spot on which the object to be projected is to be placed, the said condenser systems being adapted to receive the rays emitted by one of the sources of light and to reflect them on the said spot, and, disposed between the sources of light and the said spot, a circular chamber adapted to hold cooling liquid, the said chamber being provided with openings permitting the rays coming from the sources of light to pass on to the said spot.

2. An apparatus for episcopic projection, containing a projecting objective a plurality of sources of light arranged in a circle round the said objective, a plurality of condensers whereof each consists of a plurality of lenses, the axes of each condenser being obliquely directed inward to the spot on which the object to be projected is to be placed, the said condensers being adapted to receive the rays emitted by one of the sources of light and to reflect them on the said spot, and, disposed between the sources of light and the said spot, a circular chamber adapted to hold cooling liquid, the said chamber being provided with openings permitting the rays coming from the sources of light to pass on to the said spot, of each condenser at least one lens being disposed between the said chamber and the said spot.

3. An apparatus for episcopic projection, containing a projecting objective, a plurality of souces of light arranged in a circle round the said objective, a plurality of condenser systems, the axes of these condenser systems being obliquely directed inward to the spot on which the object to be projected is to be placed, the said condenser systems being adapted to receive the rays emitted by one of the sources of light and to reflect them on the said spot, and, disposed between the sources of light and the said spot, a circular chamber adapted to hold cooling liquid, the said chamber being provided with openings permitting the rays coming from the sources of light to pass on to the said spot, one of the lenses of each condenser providing at least on one side of the chamber a cover for the said openings.

4. An apparatus for episcopic projection, containing a projecting objective, a plurality of sources of light arranged in a circle round the said objective, a plurality of condensers whereof each consists of a plurality of lenses, the axis of each condenser being obliquely directed inward to the spot on which the object to be produced is to be placed, the said condensers being adapted to receive the rays emitted by one of the sources of light and to reflect them on the said spot, and, disposed between the sources of light and the said spot, a circular chamber adapted to hold cooling liquid, the said chamber being provided with openings permitting the rays coming from the sources of light to pass on to the said spot, of each condenser one of the lenses providing a cover on the interior side and one on the exterior side of the said openings.

WALTHER BAUERSFELD.
BRUNO GERSTENBERGER.